(12) United States Patent
Bourilkov et al.

(10) Patent No.: US 8,378,632 B2
(45) Date of Patent: Feb. 19, 2013

(54) CIRCUIT ARRANGEMENT WITH MULTIPLE BATTERIES

(75) Inventors: Jordan T. Bourilkov, Stamford, CT (US); David N. Klein, Southbury, CT (US)

(73) Assignee: The Gillette Company, Boston, MA (US)

( * ) Notice: Subject to any disclaimer, the term of this patent is extended or adjusted under 35 U.S.C. 154(b) by 967 days.

(21) Appl. No.: 11/865,932

(22) Filed: Oct. 2, 2007

(65) Prior Publication Data

US 2009/0085515 A1 Apr. 2, 2009

(51) Int. Cl.
*H02J 7/00* (2006.01)
*H02J 1/00* (2006.01)

(52) U.S. Cl. ........ 320/117; 320/118; 320/124; 320/127; 320/128; 307/71; 307/36; 307/41

(58) Field of Classification Search .................... 320/117
See application file for complete search history.

(56) References Cited

U.S. PATENT DOCUMENTS

| | | | | |
|---|---|---|---|---|
| 3,286,152 | A | * | 11/1966 | Noe ............................... 320/117 |
| 5,808,444 | A | * | 9/1998 | Saeki et al. .................... 320/117 |
| 7,038,463 | B2 | | 5/2006 | Cooper et al. |
| 2005/0194934 | A1 | * | 9/2005 | Iijima et al. .................... 320/128 |

FOREIGN PATENT DOCUMENTS

CH 608 661 1/1979

* cited by examiner

*Primary Examiner* — Yalkew Fantu
(74) *Attorney, Agent, or Firm* — Fish & Richardson P.C.

(57) ABSTRACT

Disclosed is a circuit arrangement. The circuit arrangement includes a plurality of rechargeable batteries each having at least one rechargeable electrochemical cell, and current-carrying members connecting the plurality of batteries such that when the plurality of batteries are charging the plurality of batteries are in a series electrical circuit arrangement and when the plurality of batteries are discharging the plurality of batteries are in a parallel electrical circuit arrangement.

23 Claims, 4 Drawing Sheets

CIRCUIT ARRANGEMENT WITH MULTIPLE BATTERIES

BACKGROUND

The power directed to a rechargeable battery is computed as the product of charging voltage and charging current (i.e., P=IV). Thus, a particular level of charging power can be achieved either by directing high charging current levels at relatively low charging voltage levels, or by directing lower current levels at relatively high voltage levels.

Generally, to "fast-charge" a rechargeable battery, high levels of electrical current are applied to the rechargeable battery. The use of high charging currents to charge rechargeable batteries requires relatively large and relatively expensive components, e.g., semiconductors, inductors, capacitors, etc., that are capable to handle high charging currents, in comparison to chargers that output relatively lower levels of current. On the battery side, protection circuits, e.g. fuses, Polymer thermal Cutoff (PTC's) fuses and/or Electronic Protection Boards, required for handling large charging currents become expensive and are often difficult to implement. Furthermore, the use of high charging currents to recharge a battery requires that the interface between the charger and the battery have large-sized physical dimensions to prevent melting and other deformation of the conductors. This, in turn, makes the interface bulky and less suitable to portable devices.

"Fast-charging" of a battery can alternatively be achieved by applying to the battery a high level of charging voltage at lower levels of charging current. However, under those circumstances, the higher voltage would have to be reduced (e.g., by using a step-down DC/DC converter, such as a buck converter), resulting in efficiency losses (typically 5 to 20%), quiescent drain, high costs, and added physical volume to accommodate the step-down converter.

SUMMARY

In one aspect, a circuit arrangement is disclosed. The circuit arrangement includes a plurality of rechargeable batteries each having at least one rechargeable electrochemical cell, and current-carrying members connecting the plurality of batteries such that when the plurality of batteries are charging the plurality of batteries are in a series electrical circuit arrangement and when the plurality of batteries are discharging the plurality of batteries are in a parallel electrical circuit arrangement.

Embodiments may include one or more of the following.

The plurality of batteries may be configured to achieve, when being charged, a charge level of approximately 90% of the charge capacity of the plurality of batteries in 15 minutes or less.

The current-carrying members may include at least one diode connected in series between a pair of the plurality of batteries such that when the plurality of batteries are charged the at least one diode causes charging current to flow in an electrical path through the plurality of batteries such that the plurality of batteries are in a series circuit arrangement. The at least one diode may be connected between an anode of one, of the plurality of batteries and a cathode of a succeeding one of the plurality of batteries.

The circuit arrangement may further include electrical terminals to direct power to a load. The electrical terminals may be electrically coupled to the plurality of batteries in respective electrical paths from the electrical terminals to the each of the plurality of batteries that do not pass through another of the plurality of the batteries. The electrical terminals may be directly connected to one or more of the plurality of batteries such that the corresponding electrical paths from the terminals to the one or more of the plurality of batteries are free of any of the current-carrying members. At least one of the plurality of batteries may be configured to provide power to one or more of the plurality of batteries when the one or more of the plurality of batteries provide power to the load.

In another aspect, a battery is disclosed. The battery includes a plurality of rechargeable electrochemical cells, and current-carrying members connecting the plurality of electrochemical cells such that when the plurality of electrochemical cells are charged the plurality of electrochemical cells are in a series electrical circuit arrangement and when the plurality of electrochemical cells are being discharged the plurality of electochemical cells are in a parallel electrical circuit arrangement.

Embodiments of the battery may include any feature corresponding to any of the features as set forth above for the circuit arrangement.

In a further aspect, a charger device to charge a plurality of rechargeable batteries is disclosed. The device includes a power conversion module to provide output power, and a controller configured to determine a current level corresponding to a particular charging rate, the current level being determined based on charge capacities of the plurality of rechargeable batteries, and cause the output power to be directed to the plurality of rechargeable batteries at a charging current substantially equal to the determined current level.

Embodiments may include one or more of the following.

The controller may further be configured to determine a crossover voltage to be maintained at an arrangement comprising the plurality of rechargeable batteries and current-carrying members once the crossover voltage level has been reached, the current carrying-members coupling the plurality of rechargeable batteries in a series electrical circuit arrangement. To determine the crossover voltage, the controller may be configured to compute the sum of respective maximum voltages of the plurality of rechargeable batteries and voltages at the current-carrying members coupling the plurality of rechargeable batteries in the series electrical circuit arrangement.

The controller configured to determine the current level may be configured to determine the current level corresponding to a fast-charge charging rate that, when applied to the plurality of rechargeable batteries, would cause the plurality of rechargeable batteries to achieve a charge level of at least 90% of a charge capacity of the plurality of rechargeable batteries in fifteen minutes or less.

The controller is further configured to cause the output power directed to the plurality of rechargeable batteries to be terminated after a specified charging time period has elapsed.

In yet another aspect, a circuit arrangement is disclosed. The circuit arrangement includes a plurality of rechargeable batteries each having at least one rechargeable electrochemical cell, a plurality of bi-directional current-carrying members, a first one of the plurality of bi-directional current-carrying members connecting a first terminal of one of the plurality of batteries to a like terminal of a succeeding one of the plurality of batteries, and a plurality of unidirectional current-carrying members, a first one of the plurality of unidirectional current-carrying members connecting a first terminal of a particular one of the plurality of batteries to an opposite terminal of an adjacent one of the plurality of batteries.

Embodiments may include one or more of the following.

During charging the plurality of batteries may be in an effective series arrangement.

During discharging the plurality of batteries may be, in an effective parallel electrical circuit arrangement.

The plurality of batteries may be configured to achieve, when being charged, a charge level of approximately 90% of the charge capacity of the plurality of batteries in 15 minutes or less.

The plurality of the bi-directional current-carrying members may include at least one resistor. The plurality of the unidirectional current-carrying members may include at least one diode.

The circuit arrangement may further include electrical terminals to direct power to a load. The electrical terminals may be electrically coupled to the plurality of batteries in respective electrical paths from the electrical terminals to the each of the plurality of batteries that do not pass through another of the plurality of the batteries.

An advantage of the arrangements, batteries and charger devices described herein is that the current-carrying members are connected in a configuration that does not have to be modified as the arrangement switches from one operational mode (e.g., being charged) to another operational mode (e.g., providing power to a load). Thus, a switching mechanisms, such as a controller to actuate transistors, manual switches to reconfigured electrical circuit paths, etc., is not required for the arrangements.

Another advantage of the arrangements described herein is that the charging current required to fast-charge a series arrangement of multiple batteries (or electrochemical cells) at a particular charging rate (e.g., 12 C) is lower than the charging current level required to charge a single battery, using the same particular charging rate, whose energy capacity is equal to the aggregate energy capacity of the multiple battery arrangement. As a result, the charging operation to charge the series combination of the multiple rechargeable batteries become faster for the same charging current, or uses lower current for the same charging time, than what is required for a single battery whose energy capacity is equal to the aggregate capacity of the multiple batteries in the arrangement. Additionally, the hardware requirements for the implementation of a charger and protection circuitry for the batteries in an arrangement of multiple batteries is cheaper and less complex than it is for a single battery whose energy capacity is equal to the aggregate capacity of the multiple batteries.

The details of one or more embodiments of the invention are set forth in the accompanying drawings and the description below. Other features, objects, and advantages of the invention will be apparent from the description and drawings, and from the claims.

DETAILED DESCRIPTION

Disclosed is an arrangement of rechargeable batteries (or electrochemical cells) that are connected in a series electrical configuration during re-charging operation and are connected in a parallel configuration during discharge when the batteries are connected to a load. To implement this type of two-mode battery arrangement, unidirectional current-carrying member (e.g., diodes) and bi-directiorial current-carrying members (e.g., resistors) are used to connect the batteries. The serial/parallel battery arrangement described herein is suitable for ultra-fast charge operations using moderate charging currents.

Figure 1:
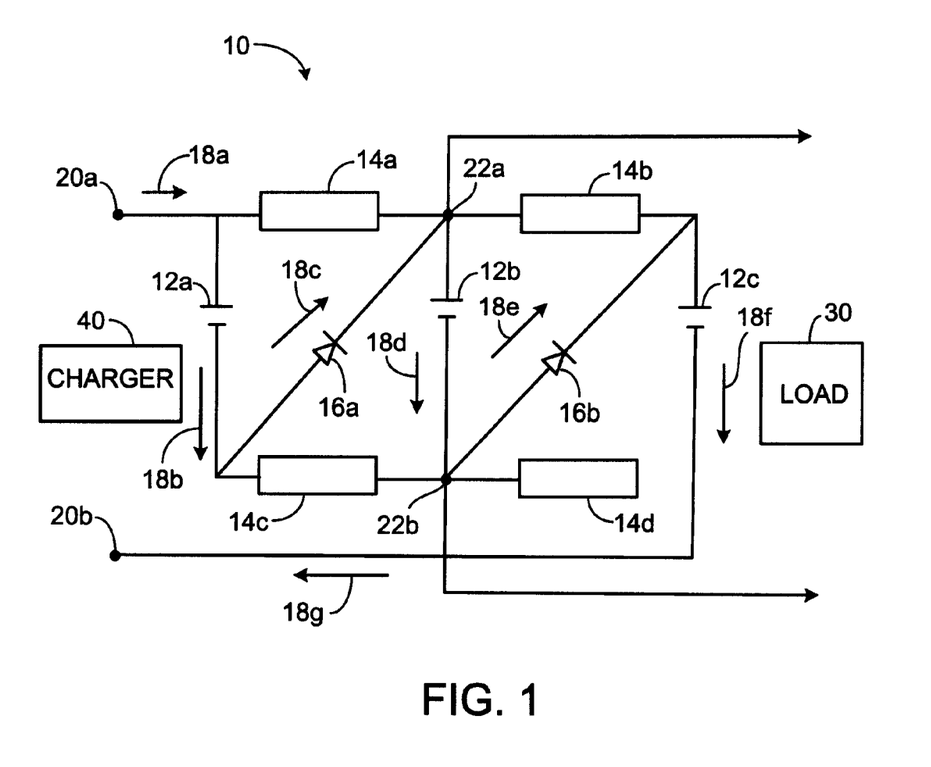
FIG. 1 is a circuit diagram of an exemplary embodiment of a circuit arrangement with multiple batteries.

Referring to FIG. 1, an exemplary embodiment of a battery arrangement 10 with a plurality batteries 12$a$-$c$, each comprising one or more rechargeable electrochemical cells is shown. While FIG. 1 depicts an embodiment in which the arrangement 10 includes three (3) batteries, any number of batteries (e.g., more than three batteries) may be included in the arrangement, and be connected to each other in a manner similar to the manner of connection for the three-battery arrangement described herein. The batteries 12$a$-$c$ may be cylindrical batteries, prismatic batteries, button-cell batteries, and so forth. The depicted arrangement may be implemented internally within a single battery that includes multiple rechargeable electrochemical cells. Thus, although the description provided herein is made with respect to an arrangement of batteries that each comprise electrochemical cells, the description is also applicable for arrangements of multiple electrochemical cell in a single battery.

The batteries 12$a$-$c$ comprise Li-Ion cells having graphitic anode material or lithium titanate anode material, and lithiated-iron-phosphate cathode materials adapted to enable fast recharge of rechargeable batteries based on such materials. The batteries 12$a$-$c$ that are so constructed are configured to achieve a charge level of at least 90% of the charge capacity for that battery (or cell) in fifteen (15) minutes or less, when recharged by a suitable charger. In the embodiments described herein, electrochemical cells can be primary cells or secondary cells. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). On the other hand, secondary electrochemical cells, also referred to below as rechargeable cells or batteries, that can be recharged many times, e.g., fifty times, a hundred times, and so forth. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

As further shown in FIG. 1, the batteries 12$a$-$c$ are electrically coupled to each other through current-carrying members that include, for the depicted three-battery embodiment of FIG. 1, resistors 14$a$-$d$ and diodes 16$a$-$b$. While the diodes 16$a$-$b$ enable current to flow in only one direction (e.g., unidirectional, i.e., when a forward bias voltage is applied to the diodes), resistors permit current to flow in either direction. The current-carrying members 14$a$-$d$ and 16$a$-$b$ are arranged in a configuration that is generally non-modifiable such that when the charger (e.g., a charger 40 shown in FIG. 2) applies charging current to the arrangement 10 the batteries 12$a$-$c$ are coupled in a series electrical circuit arrangement, and when the batteries 12$a$-$c$ are discharged to provide power current to a load 30 (e.g., a battery-operable device such as a cell phone, personal digital assistance, flash light, etc.) the batteries 12$a$-$c$ are connected in a parallel electrical circuit arrangement.

Particularly, the first, diode 16$a$ couples the anode electrode of the battery 12$a$ to the cathode electrode of the battery 12$b$, and the second diode, 16$b$ couples the anode electrode of the battery 12$b$ to the cathode electrode of the battery 12$c$. The resistors 14*a-b* couple respective cathode electrodes of the batteries to each other, and resistors 14*c-d* electrically couple respective anode electrodes of the batteries. The resistors 14*a-d* have associated resistance values that are high enough so that when the charger 40 applies a voltage at charging terminals 20*a* and 20*b*, the corresponding charging current delivered by the charger 40 will flow predominantly through the series electrical path defined by the battery 12*a*, the diode 16*a*, the battery 12*b*, the diode 16*b* and the battery 12*c* (the path followed by the charging current is depicted using arrows 18*a-g*).

In other words, the effective resistance of one of the batteries 12*a-c* plus one of the diodes 16*a* and 16*b* is sufficiently lower than the resistance of the corresponding one of the resistors 14*a-d* coupled between the diode and the battery so that little current flows through the one of the resistors 14*a-d* when the charger 40 directs current via the terminals 20*a-b*. Put another way, the resistance value, R, of any of the resistors 14*a-d*, for example, resistor 14*a*, is high enough such that the current through the resistor is much smaller then the battery charging current. The voltage $V_R$ across the resistor 14*a* equals the voltage across the battery 12*a* plus the diode 16*a* (i.e., $V_R = I_{resisistor} R = V_{battery12a} + V_{forward\ 16a}$), meaning that a high resistance value results in a small resistor current for a fixed IR value.

Having the batteries in a sense arrangement requires a higher charging voltage applied at the first set of terminals (corresponding to the number of batteries in the arrangement, N, times each battery's charging voltage, $V_{battery}$), whereas the charging current that is required is smaller than what would be necessary to charge, at the same charging rate, a single battery having an energy capacity equal to the aggregate capacity of the multiple batteries.

As further shown, the load 30 is electrically coupled to the battery arrangement 10, via the arrangement's 10 output terminals 22*a* and 22*b*. The terminals 22*a* and 22*b* are electrically coupled directly to one or more of the batteries 12*a-c*; i.e., without an intervening current-carrying member connected between the terminals and the one or more batteries. The terminals 22*a* and 22*b* are connected to at least one of the batteries 12*a-c* through one or more current-conducting member. In the embodiment shown in FIG. 1, the output terminals 22*a-b* of the arrangement 10 are directly electrically coupled to the middle battery, namely the battery 12*b*, and thus, when the load 30 is electrically coupled to the arrangement 10, the battery 12*b* provides power to the load 30 at that battery's associated battery voltage $V_{battery}$, e.g., 3.0 to 4.2V for a typical Lithium-Ion battery of (e.g., batteries in which the anode of a conventional Li-ion cell is made from carbon, the cathode is a metal oxide, and the electrolyte is a lithium salt in an organic solvent). In some embodiments, a different battery voltage, corresponding, for example, to other types of batteries such as lead acid, NiCd and NiMH batteries, may be used.

The other batteries in the arrangement 10 (e.g., the batteries 12*a* and 12*c*) that are electrically coupled to the terminals 22*a* and 22*b* via resistors (14*a* and 14*c* for the battery 12*a* and resistors 14*b* and 14*d* for the battery 12*b*) provide power to replenish the charge level of the battery 12*b* whose charge is being depleted by the power-consuming load 30. Thus, the batteries not directly connected to the output terminals 22*a* and 22*b* are charge reservoirs that are used to recharge the middle battery 12 as its charge level drops.

When the batteries 12*a-c* are at full charge, and are outputting substantially equal voltage levels, there will be little or no current flowing between the batteries as there will typically be little or no potential difference at the resistor elements connecting the various batteries (e.g., the voltage at one terminal of a resistor, e.g., the resistor 14*a*, will be approximately the same as the voltage at the resistor's other terminal, resulting in a potential difference of approximately 0V across that resistor). As the arrangement 10 begins to power the load 30, and the load 30 draws current substantially from the battery 12*b* which is directly electrically coupled to the load via the terminals 22*a* and 22*b*, the voltage outputted by the battery 12*b* will start to decrease at some point as the charge level of the battery decreases. As a result, the respective potential differences across the resistors separating the various batteries 12*a-c* will become non-zero and consequently current will flow through the resistors (e.g., for a particular resistor, current at a level equal to the potential difference across that particular resistor divided by its resistance, will flow through that resistor). The currents flowing through the resistors as a result of the decrease in the voltage outputted by the middle battery powering the load 30 will be directed into the battery 12*b*, and will thus cause the charge level in the battery 12*b* to be increased.

The arrangement 10 is thus configured, when connected to a load, to provide power to the load at a voltage substantially equal to the voltage of an individual battery (rather than at, for example, a cumulative voltage resulting from a series combination of the batteries 12*a-c*), and to re-charge the charge level of the individual battery providing power to the load from the other batteries that are electrically coupled to it in a parallel electric-circuit arrangement. The arrangement 10, therefore, provides voltage balancing functionality.

Charging of at least some of the batteries of the arrangement 10 may be performed at substantially the same time that the battery(s) directly connected to the load is delivering energy to the load to power it.

The battery arrangement enables charging a plurality of rechargeable batteries using a relatively low charging current by connecting the plurality of batteries in a series electrical arrangement. The corresponding charging voltage, for such an arrangement, is equal to the sum of the respective voltages of the batteries in the arrangement and the voltages at the current-carrying members coupling the batteries in a series arrangement.

For example, in an arrangement similar to the one shown in FIG. 1, in which the batteries 12*a-c* are 500 mAh Li-ion batteries ("Ah" is the unit of battery capacity ampere-hour) and in which the diodes 16*a* and 16*b* are Schottky diodes, the charging current required to charge the batteries at a charging rate of 12 C (a charging rate of 1 C corresponds to the current that would be required to charge a battery in one hour and thus a charging rate of 12 C is the charging current required to charge the battery in 1/12 of an hour, or five minutes) is approximately 6 A (i.e., 6 A*1/12 hours=500 mAh). The charging voltage that would be applied at the terminals 20*a-b* is approximately 13.4V (3 times 4.2V, which is the voltage of the individual batteries 12*a-c* when they are charged to a sufficiently high level, e.g., 90% capacity, plus 2 times 0.4V, which is the forward-bias voltage required to cause Schottky diode to begin conducting current). After the individual batteries are charged, a load connected to the arrangement would draw power from, for example, one battery (e.g., battery 12*b* in the arrangement 10) while the other batteries (e.g., 12*a* and 12*c*) would replenish the charge level of the battery 12*b*. Thus, the power available to provide to the load 30 is three (3) times 500 mAh, or 1500 mAh.

In contrast, in circumstances where a single rechargeable battery having a capacity of 1500 mAh Li-Ion battery with a charge voltage of 4.2V is used instead of three 500 mAh batteries connected in the manner of the arrangement 10, the charging current that would be required to achieve a charging rate of 12 C (i.e., charge the 1500 mAh battery to at least 90% charge capacity in approximately five minutes) would be 18 A (18 A×$\frac{1}{12}$ hours=1500 mAh).

Thus, the charging current required to fast-charge a single rechargeable battery at a particular charging rate (e.g., 12 C) is higher than the charging current level required to charge a series combination of several rechargeable batteries, using the same particular charging rate, whose aggregate energy capacity is equal to the capacity of the single rechargeable battery. As a result, the charging operation to charge the series combination of multiple rechargeable batteries is safer, and the hardware requirements for the implementation of a charger and protection circuitry for the batteries is cheaper and less complex.

In some embodiments, the battery is directly connected to the load so that it can handle high-current peaks of the load during discharge. The values of the resistors may be selected so as to allow adequate charge equalization time depending on the usage pattern of the device. For example, a device with a higher current drain would require lower resistor values to permit higher balancing currents to flow amongst the batteries.

As explained above, while the arrangement 10 shown in FIG. 1 depicts an arrangement of multiple individual batteries each having at least one rechargeable electrochemical cell, the arrangement shown in FIG. 1 can be similarly implemented within individual batteries. In other words, the internal electrical configuration of rechargeable batteries can include multiple electrochemical cells disposed within a single battery casing. Under these circumstances, the single battery would have two sets of terminals, with a first set of dedicated terminals configured to receive a charging current applied by an external charger, and the other set of terminals configured to output the battery's voltage to a battery-operable device.

When a charging current is delivered through the first set of terminals on the battery, the electrical arrangement of the electrochemical cells, as viewed from the first set of terminals, is one corresponding to a series electrical connection. As described in relation to the circuit arrangement of FIG. 1, the series combination is achieved by using current carrying members, such as diodes and/or resistors, to implement the arrangement. Thus, when charging current is delivered through that first set of terminals, the charging current would flow in a single path passing through the electrochemical cells. The electrical connection between the multiple electrochemical cells of the battery would be one in which the anode of one electrochemical cell would be connected to the cathode of another electrochemical cell. Under these circumstances the voltage applied by the charger at the first set of dedicated terminals would be equal to the sum of the voltages at the electrodes of the electrochemical cells of the battery and any voltage at current-carrying members coupling the electrochemical cells.

On the other hand, when the battery is delivering power to a battery-operable device through a second set of terminals, the electrical arrangement of the electrochemical cells, as viewed from the second set of terminals, is one corresponding to a parallel electrical connections of the individual electrochemical cells. Power is delivered from the electrochemical cell(s) that is directly coupled to the second set of terminals (i.e., the current delivered by the cell does not have to pass through current-carrying members such as resistors, diodes, etc.) Under these circumstances, the voltage applied at the second set of terminals is substantially equal to the voltage produces at the electrodes of the electrochemical cell(s) directly coupled to the second set of terminals. The other electrochemical cells not directly coupled to the second set of terminals provide power to the electrochemical cell(s) that delivers power to the battery-operable device, and effectively replenish ("top-off") the charge level of the electrochemical cell(s) delivering the power, thus extending the use period of that electrochemical cell(s) before another recharging operation is required.

A battery in which the electrochemical cells are coupled in a manner similar to that depicted in FIG. 1 is one based, for example, on use of jelly-roll lithium-iron-phosphate electrodes. A description of such a battery is provided, for example, in U.S. patent application Ser. No. 11/776,350, entitled "A Battery With Integrated Voltage Converter", and U.S. patent application Ser. No. 11/827,366 "Lithium Ion Secondary Batteries," both filed Jul. 11, 2007, the contents of which are hereby incorporated by reference in their entireties.

Figure 2:
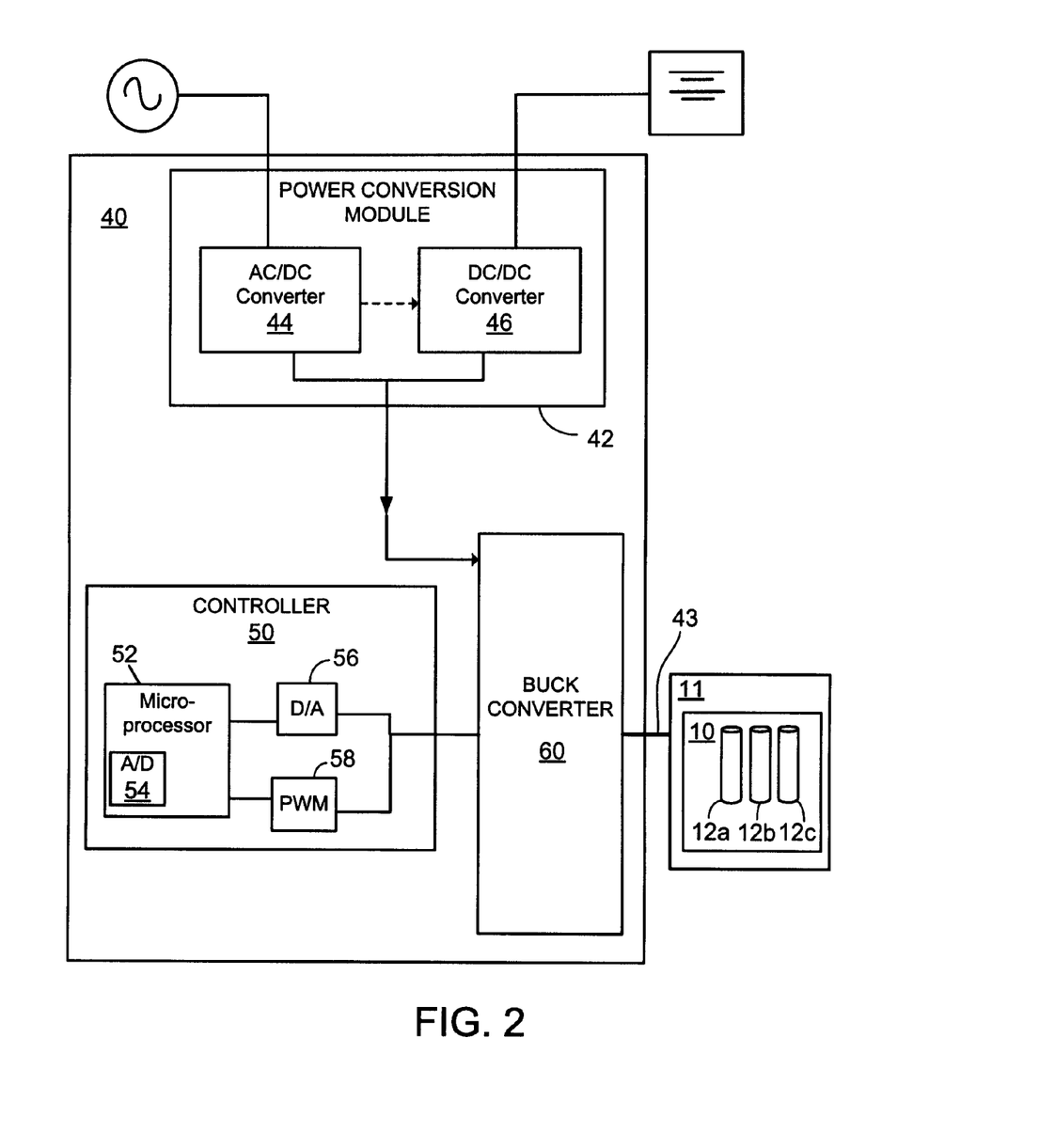
FIG. 2 is a block diagram of an exemplary embodiment of a charger to charge the circuit arrangement of FIG. 1.

Referring to FIG. 2, an exemplary embodiment of a charger 40 is shown. The charger 40 is configured to provide power to the circuit arrangement 10 to cause the batteries 12a-c of the arrangement 10 to recharge. The charger 40 may be a device that is external to a housing 11 in which the batteries 12a-c are disposed (e.g., a cell-phone housing that includes a chamber to receive and hold the batteries), or the charger 40 may be another module disposed in the same housing that also holds the batteries 12a-c. In some embodiments, the charger 40 is configured to provide power at a charging current level that causes the batteries (e.g., lithium-iron-phosphate batteries) to achieve a charge level of at least 90% of the charge capacity of those batteries in fifteen (15) minutes or less.

Particularly, and as explained above, when the charger 40 is operating and provides power to the circuit arrangement 10, the power delivered to arrangement at a determined charging current is applied through the terminals 20a-b of the arrangement. The circuit configuration of the arrangement 10, as viewed from the terminals 20a-b, when voltage/current is applied at the terminals 20a-b is one corresponding to a series arrangement of the batteries. In some embodiments, the charger 40 is configured to apply a constant charging current to the rechargeable batteries 12a-c. During the period in which a constant current is delivered to the battery (during this period the charger is said to be operating in constant current, or CC mode), the voltage, of the batteries 12a-c increases. When the combined voltage of the batteries reaches a pre-determined upper limit voltage of, for example, 11.4V (corresponding to a typical crossover voltage 3.8V for a rechargeable battery, times 3), or 12.2V with the voltage drop across the diodes, the charger 40 is configured to apply to the arrangement of batteries 12a-c, for the remainder of the charging period, a constant voltage having this value. During the period that the constant voltage, substantially equal to the pre-determined combined crossover voltage value, is applied to the batteries 12a-c, the charger 40 is said to be operating in constant voltage, or CV, mode.

The charger 40 is coupled to a power conversion module 42. The power conversion module 42 includes an AC/DC converter 44 that is electrically coupled to an AC power source, external to the charger, such as a source providing power at a rating of 85V-265V and 50 Hz-60 Hz, and converts the AC power to a low D.C. voltage (e.g., 5-24V) and e.g., feeds this low D.C. voltage to, e.g., a DC-DC converter 46 to provide a level suitable for charging rechargeable batteries (e.g., DC, voltages at levels of approximately between 3.7-4.2V per each lithium-iron-phosphate battery in an electrical series battery arrangement such as the one shown in FIG. 1. Batteries based on different chemistries may require different voltage levels.)

The charger 40 includes a controller 50 that is configured to determine the charging current to be applied to the batteries 12a-c, apply to the batteries 12a-c a current substantially equal to the determined charging current, and terminate the charging current after a specified or pre-determined, time period has elapsed. The controller 50 may be configured to terminate the charging current once a pre-determined battery voltage or charge level has been reached. In some embodiments, the controller 50 regulates a buck converter 60 to apply a constant charging rate of, for example 12 C that would cause the rechargeable battery to be charged in approximately five (5) minutes. In some embodiments, a single stage AC/DC converter can be used without having to use a buck converter stage.

The determined charging current corresponding to the particular charging rate is applied until a predetermined maximum charge voltage is reached and/or a period of, e.g., five (5) minutes, has expired. Once the maximum charge voltage is reached, the controller 50 changes control modes and applies a constant voltage to the batteries 12a-c, until, in some embodiments, the pre-determined charge time has expired, e.g., 5 minutes.

Determination of the current level corresponding to a particular charging rate that is to be applied to the arrangement 10 at the terminals 20a-b is based on the charge capacity of the batteries 12a-c. For example, for a three (3) battery arrangement in which each battery is a lithium-iron-phosphate battery having a capacity of 500 mAh and a maximum voltage of 4.2V, the current level required to charge a series arrangement of these batteries at a charge rate of 12 C (i.e., in approximately 5 minutes), is approximately 6 A (500 mAh/0.0833 h=6 A). In some embodiments, the controller 50 is also configured to determine the crossover voltage level that is to be maintained at the terminals 20a-b once, that level is reached. The determined crossover voltage may be computed based on the voltage at the arrangement 10 when the batteries 12a-c are coupled in a series electric configuration using the current-carrying members (e.g., the diodes 16a and 16b). Thus, for example, for the three lithium-iron-phosphate batteries that have a maximum voltage of 4.2V and with the diodes 16a and 16b having forward bias voltage of 0.4 each, the crossover voltage determined by the controller 50 may be 13.4V.

Determination of the charging current to be applied to the batteries 12a-c may also be based, at least in part, on user specified input provided through a user interface disposed, for example, on a housing (not shown) of the charger 40. Such a user interface may include, for example, switches, buttons and/or knobs through which a user may indicate, for example, the capacity of the of battery(ies) that is to be recharged. Additionally, the interface may be configured to enable the user to specify other parameters germane to the charging process, such as, for example, the charging period. To determine the specific charging current to use, a lookup table that indexes suitable charging currents corresponding to the user-specified parameters may be accessed.

Determination of the charging current to be applied is performed by identifying the capacity of the battery(s) placed in the charging compartment of the charger 70 using, for example, an identification mechanism that provides data representative of the capacity of the batteries 12a-c included in the arrangement 10 and/or data representative of the batteries' types. A detailed description of an exemplary charger device that includes an identification mechanism based on the use of an ID resistor having a resistance representative of a battery's capacity is provided in U.S. patent application Ser. No. 11/776,261, entitled "Ultra Fast Battery Charger with Battery Sensing", and filed Jul. 11, 2007, the content of which is hereby incorporated by reference in its entirety.

Determination of the charging current may be performed by measuring at least one of electric characteristics indicative of the capacity and/or type of the plurality of batteries (e.g., the batteries' charging resistance.) A detailed description of an exemplary charger device that adaptively determines the charging current based on measured characteristics of the battery is provided in U.S. patent application Ser. No. 11/775,987, entitled "Adaptive Charger Device and Method", and filed Jul. 11, 2007, the content of which is hereby incorporated by reference in its entirety.

The controller 50 includes a processor device 52 configured to control the charging operations performed on the batteries 12a-c of the arrangement 10. The processor device 52 may be any type of computing and/or processing device, such as a PIC18F1320 microcontroller from Microchip Technology Inc. The processor device 52 used in the implementation of the controller 50 includes volatile and/or non-volatile memory elements configured to store software containing computer instructions to enable general operations of the processor-based device, as well as implementation programs to perform charging operations on the batteries 12a-c coupled to the charger 40, including such charging operations that cause the batteries 12a-c to achieve at least 90% charge capacity in less than fifteen (15) minutes. The processor device 52 includes an analog-to-digital (A/D) converter 54 with multiple analog and digital input and output lines. The controller 50 also includes a digital-to-analog (D/A) converter device 56, and/or a pulse-width modulator (PWM) 58 that receives digital signals generated by the processor device 52 and generates in response electrical signals that regulate the duty cycle of switching circuitry, such as the buck converter 60 of the charger 40.

Figure 3:
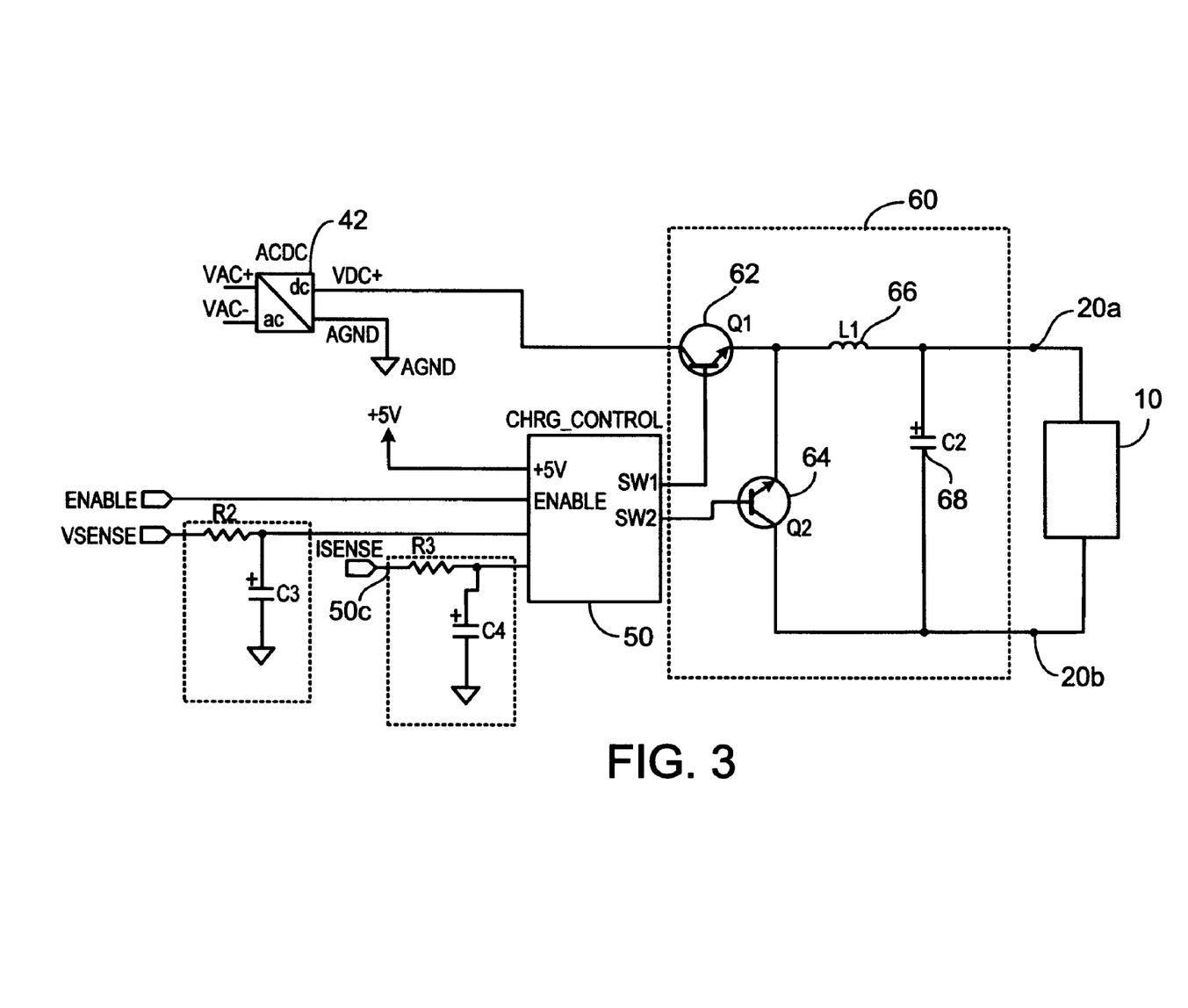
FIG. 3 is a circuit schematic of the charger device of FIG. 2.

FIG. 3 shows the buck converter 60 including two, e.g., Bi-Polar Junction Transistors (BJT's) 62 and 64 and an inductor 66 that stores energy when the power conversion module 42 is in electrical communication with the buck converter 60, and which discharges that energy as current during periods that the power conversion module 42 is electrically isolated from the buck converter 60. The buck converter 60 shown in FIG. 3 also includes a capacitor 68 that is also used as an energy storage element. The inductor 66 and the capacitor 68 also act as output filters to reduce the switching current and voltage ripples at the output of the buck converter 60. Further details of the operation of a buck converter, such as the buck converter 60 shown in FIG. 3, is described, for example, in U.S. patent application Ser. No. 11/776,021, entitled "Fast Battery Charger Device and Method," and filed Jul. 11, 2007, the content of which is hereby incorporated by reference in its entirety.

Generally, to cause the output power at a charging current substantially equal to the determined current to be directed to the batteries 12a-c of the arrangement 10, the on-period, or duty cycle, for the power conversion module 42 is adjusted by adjusting the on-period of the transistor 62 until the charging current applied to the battery 12 reaches a level substantially equal to the value of the determined current.

Thus, the current provided by the power conversion module 42 during the on-period of the transistor 62, and the current provided by the inductor 66 and/or the capacitor 68 during the off-periods of the transistor 62 should result in an effective current substantially equal to the required charging current.

In some embodiments, the controller 50 periodically receives (e.g., every 0.1 second) measurements of the current flowing through the batteries 12a-c as measured, for example, by a current sensor that communicates the measured value in one or both batteries via a terminal 50c (marked ISENSE) of the controller 50. Based, on this received measured current, the controller 50 adjusts the duty cycle to cause an adjustment to the current flowing through the batteries 12a-c so that that current converges to a value substantially equal to the charging current level. The buck converter 60 is thus configured to operate with an adjustable duty cycle that results in adjustable current levels being supplied to the batteries 12a-c. The controller 50 may also periodically receive measurements of the voltage of the batteries, once the crossover voltage has been reached to maintain the voltage at the terminals 20a-b at that crossover voltage level.

In addition to the voltage sensor and/or the current sensor, the charger 40 may include other sensors configured to measure other attributes of either the batteries 12a-c and/or the charger 40. For example, in embodiments in which thermal control of the charger 40 is required (e.g., for charger that have a charging period of more than 15 minutes), the charger 40 may include temperature sensors (e.g., thermistors) coupled to the batteries 12a-c and/or to a circuit board, on which modules of the charger 40 may be disposed.

In some embodiments, the charger 40 could include a docking station, powered by AC or CLA (12V DC car cigarette light adapter), and structured to receive the battery-operable device in which the batteries 12a-c are disposed. The battery-operable device is placed in the docking station in a mating configuration.

Figure 4:
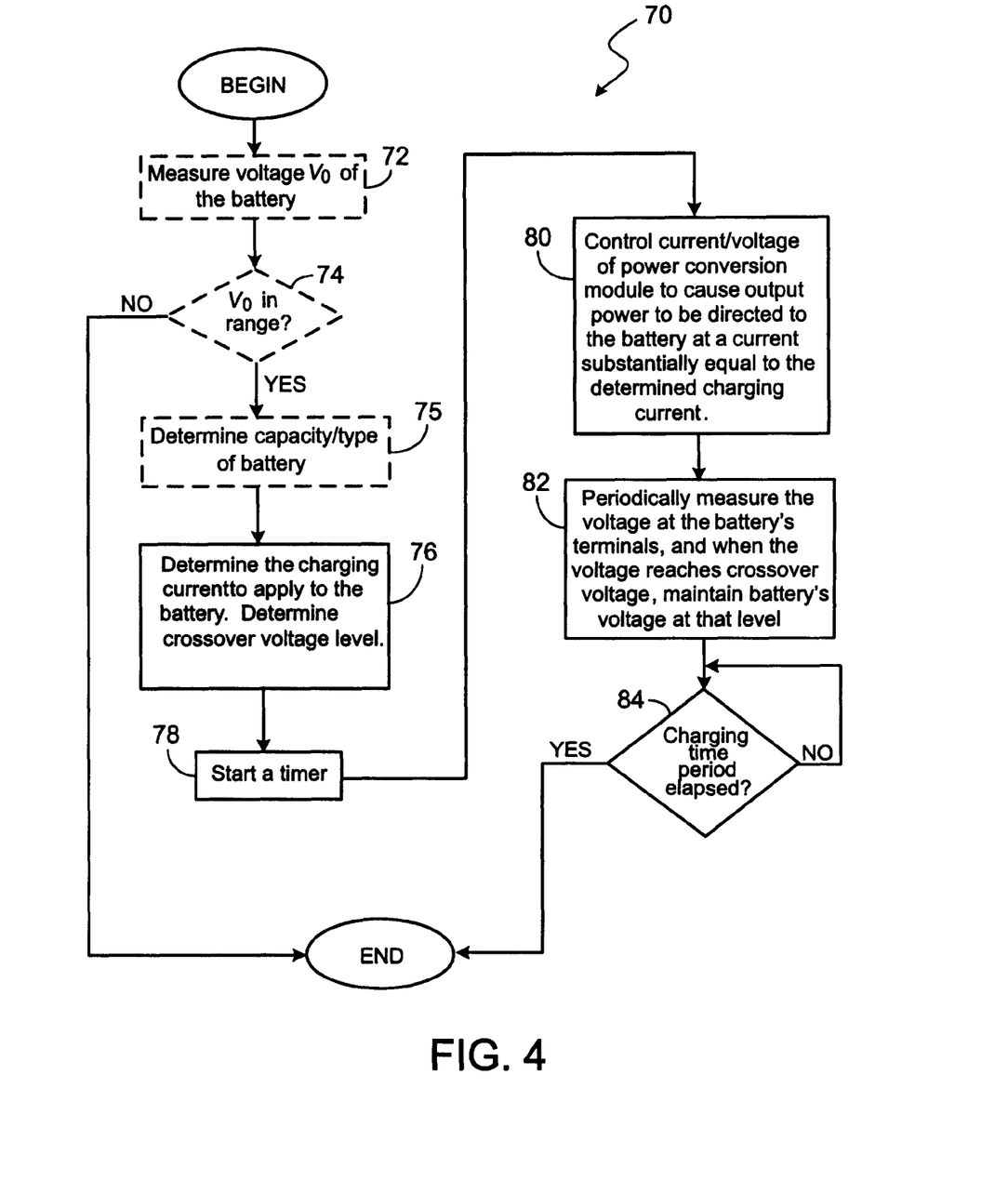
FIG. 4 is a flow diagram of an exemplary embodiment of a procedure to perform a charging operation using the charger of FIG. 2.

FIG. 4 depicts an exemplary charging procedure 70 to recharge the rechargeable batteries 12a-c. In some embodiments, the batteries 12a-c are disposed within a battery chamber of a battery-operable device that is to be powered by the batteries 12a-c and thus the charger 40 electrically couples connected to the batteries 12a-c via an interface, e.g., a harness interface having a 3-pin connector (not shown). Under those circumstances, the charger device includes a cable 43 (as shown in FIG. 2) connected to an adapter that connects to the interface on the housing of the battery-operable device.

Initially, the charger 40 may optionally determine, prior to commencing the charging operations, whether certain fault conditions exist. Thus, for example, the charger 40 measures 72 the voltage of the terminals 20a-b, and thus the voltage corresponding to the series combination of the batteries 12a-c. The charger 40 determines 74 whether the measured voltage $V_0$ is within a predetermined range, e.g., 6-11.4V for an arrangement that includes 3 batteries (i.e., a range corresponding to the number of batteries in the arrangement 10, times the acceptable individual voltage ranges for the rechargeable batteries which, in some embodiments, is between 2-3.8V). In circumstances in which it is determined that the measured voltage is not within the predetermined acceptable ranges, thus rendering a charging operation under existing conditions to be unsafe, the charger does not proceed with the charging operation, and the procedure 70 may terminate. In some embodiments, the charger 40 may obtain individual voltage measurements for each of the batteries in the arrangement 10.

The charger 40 determines 76 a charging current to be applied to the batteries 12a-c. In some embodiments, determination of the charging current level corresponding to a particular charging rate is based on the charge capacity of the batteries 12a-c. In some embodiments, the determined charging current is such that the batteries 12a-c achieves at least a 90% charge capacity in less than fifteen minutes. Particularly, in some embodiments the charger 40 determines a charging current that achieves a 90% charge capacity in approximately 4-6 minutes (corresponding to a charging rate of 10-15 C).

If the charger 40 is adapted to charge different types of batteries and/or batteries having different capacities, the charger 40 may determine 75 the capacity and/or type of the batteries 12a-c. In some embodiments, the charger 40 includes an identification mechanism configured to measure the resistance of an ID resistor(s) representative of the capacity and/or type of the batteries 12a-c. Additionally and/or alternatively, the capacity and/or type of the batteries 12a-c may be communicated to the charger via a user interface disposed, for example, on the housing of the charger 40. The charger 40 can thus determine the appropriate charging current to apply to the battery based on this data. For example, in circumstances where the charger 40 determines the resistance of an ID resistor(s) of the batteries 12a-c, the charger 40 may access a lookup table stored on a memory storage module of the charger 40 that indexes suitable charging currents corresponding to the capacity associated with the computed resistance.

In some embodiments, the crossover voltage level that is to be maintained at the terminals 20a-b once that level is reached is also determined. The determined crossover voltage may be computed based on the voltage at the arrangement 10 when the batteries 12a-c are coupled in a series electric configuration using the current-carrying members (e.g., the diodes 16a and 16b).

Having determined the charging current to be applied to battery 12a-c, a timer, configured to measure the pre-specified time period of the charging operation, is started 78. The timer may be, for example, a dedicated timer module of the processor 52, or it may be a counter that is incremented at regular time intervals measured by an internal or external clock of the processor 52.

The current/voltage applied by the power conversion module 42 is controlled 80 to cause an output power to be directed to the batteries 12a-c at a constant current substantially equal to the determined charging current. The combined current applied from the power conversion module 42 and the current discharged from the inductor 66 and/or the capacitor 68 result in an effective current substantially equal to the determined charging current.

The batteries 12a-c are charged with substantially a constant current until the voltage at the terminals 20a-b of the arrangement 10 reaches a pre-determined upper voltage limit. Thus, the voltage applied at the terminals 20a-b is periodically measured 82 to determine when the pre-determined upper voltage limit (i.e., the crossover voltage) has been reached. When the voltage at the terminals 20a-b of the arrangement 10 has reached the pre-determined upper voltage limit, e.g., 12.6V (13.4V with the diodes) for an arrangement that includes three batteries, the power conversion module 42 is controlled (also at 82) to have a constant voltage level substantially equal to the crossover voltage level maintained at the terminals 20a-n of the arrangement 10.

After a period of time substantially equal to the charging time period has elapsed, as determined 94, the charging current applied to the arrangement 10 (and thus the batteries 12a-c) is terminated. The charging procedure is terminated at the expiration of a particular period of time after the pre-determined upper voltage limit of the batteries 12a-c has been reached, or after some specified charge level of the batteries 12a-c has been reached.

OTHER EMBODIMENTS

A number of embodiments of the invention have been described. Nevertheless, it will be understood that various modifications may be made without departing from the spirit and scope of the invention. For example, any number of batteries (or electrochemical cells) can be arranged in a series/parallel configuration such as the one described herein. Further, MOSFET transistors with very low on-resistance can be used in place of the diodes (such as the diodes 16a and 16b in FIG. 1). In such embodiments, when the MOSFET transistors are turned "on", an electrical path connecting the rechargeable batteries in series is effected. During discharge, when a load is connected to the battery arrangement, the MOSFET transistors are turned "off". Use of MOSFET transistors eliminates losses due to the forward voltage of the diodes. Another set of MOSFET transistors can replace the resistors by turning those transistors "on" during discharge and "off" during charge, thus connecting the batteries in parallel during discharge. Use of MOSFET transistors in place of the resistors enables elimination of resistor losses during discharge. In situations where MOSFETS are used, the charger can produce a signal which in a first state indicates that the charger is charging and the battery can have terminals that receive that signal causing MOSFETS that are substituting for resistors to turn on and permit current to flow, whereas the MOSFETS that substitute for diodes remain off. Other embodiments are within the scope of the following claims.

What is claimed is:

1. A circuit arrangement comprising:
a plurality of rechargeable batteries each having at least one rechargeable electrochemical cell; and
current-carrying members connecting the plurality of batteries such that when the plurality of batteries are charging the plurality of batteries are in a series electrical circuit arrangement and when the plurality of batteries are discharging the plurality of batteries are in a parallel electrical circuit arrangement, the current-carrying members including one or more unidirectional current-carrying members and one or more bi-directional current-carrying members;
a first electrical terminal to direct power from the plurality of batteries to a load, the first electrical terminal being connected, either directly or through an electrical path that includes only one or more of the bi-directional current-carrying members, to an anode of each of the plurality of batteries; and
a second electrical terminal to direct power from the plurality of batteries to the load, the second electrical terminal being connected, either directly or through an electrical path that includes only one or more of the bi-directional current-carrying members, to a cathode of each of the plurality of batteries.

2. The arrangement of claim 1 wherein the plurality of batteries is configured to achieve, when being charged, a charge level of approximately 90% of the charge capacity of the plurality of batteries in 15 minutes or less.

3. The arrangement of claim 1 wherein the unidirectional current-carrying members include at least one diode connected in series between a pair of the plurality of batteries such that when the plurality of batteries are charged the at least one diode causes charging current to flow in an electrical path through the plurality of batteries such that the plurality of batteries are in a series circuit arrangement.

4. The arrangement of claim 3 wherein the at least one diode is connected between an anode of one of the plurality of batteries and a cathode of a succeeding one of the plurality of batteries.

5. The arrangement of claim 1 wherein the electrical terminals are electrically coupled to the plurality of batteries in respective electrical paths from the electrical terminals to each of the plurality of batteries that do not pass through another of the plurality of the batteries.

6. The arrangement of claim 5 wherein at least one of the plurality of batteries is configured to provide power to one or more of the plurality of batteries when the one or more of the plurality of batteries provide power to the load.

7. The arrangement of claim 1 wherein the bidirectional current-carrying members include at least one resistor connected in series between like terminals of a pair of the plurality of batteries such that when the plurality of batteries discharge the at least one resistor causes discharging current to flow in parallel electrical paths from the plurality of batteries between the first and second terminals.

8. The arrangement of claim 1 wherein the plurality of the bi-directional current-carrying members includes at least one resistor, and wherein the plurality of the unidirectional current-carrying members includes at least one diode.

9. The arrangement of claim 1 wherein the bidirectional current-carrying members include a plurality of resistors connected in series between like terminals of pairs of the plurality of batteries such that when the plurality of batteries discharge the resistors cause discharging current to flow in parallel electrical paths from the plurality of batteries between the first and second terminals.

10. The arrangement of claim 9 wherein the resistors have a resistance value that are high enough so that charging current delivered flows predominantly through the series electrical path.

11. A battery comprising:
a plurality of rechargeable electrochemical cells; and
current-carrying members connecting the plurality of electrochemical cells such that when the plurality of electrochemical cells are charged the plurality of electrochemical cells are in a series electrical circuit arrangement and when the plurality of electrochemical cells are being discharged the plurality of electrochemical cells are in a parallel electrical circuit arrangement, the current-carrying members including one or more unidirectional current-carrying members and one or more bi-directional current-carrying members;
a first electrical terminal to direct power from the plurality of batteries to a load, the first electrical terminal being connected, either directly or through an electrical path that includes only one or more of the bi-directional current-carrying members, to an anode of each of the plurality of batteries; and
a second electrical terminal to direct power from the plurality of batteries to the load, the second electrical terminal being connected, either directly or through an electrical path that includes only one or more of the bi-directional current-carrying members, to a cathode of each of the plurality of batteries.

12. The battery of claim 11 wherein the plurality of electrochemical cells is configured to achieve, when being charged, a charge level of approximately 90% of the charge capacity of the plurality of electrochemical cells in 15 minutes or less.

13. The battery of claim 11 wherein the current-carrying members include at least one diode connected in series between a pair of the plurality of electrochemical cells such that when the plurality of electrochemical cells are charged the at least one diode causes charging current to flow in an electrical path through the plurality of electrochemical cells such that the plurality of electrochemical cells are in a series circuit arrangement.

14. The battery of claim 13 wherein the at least one diode is connected between an anode of one of the plurality of electrochemical cells and a cathode of a succeeding one of the plurality of electrochemical cells.

15. The battery of claim 11 wherein the electrical terminals are electrically coupled to the plurality of electrochemical cells in respective electrical paths from the electrical terminals to the each of the plurality of electrochemical cells that do not pass through another of the plurality of the electrochemical cells.

16. The battery of claim 15 wherein at least one of the plurality of electrochemical cells is configured to provide power to the one or more of the plurality of electrochemical cells when the one or more of the plurality of electrochemical cells provides power to the load.

17. The arrangement of claim 11 wherein the plurality of the bi-directional current-carrying members includes at least one resistor, and wherein the plurality of the unidirectional current-carrying members includes at least one diode.

18. A circuit arrangement comprising:
   a plurality of rechargeable batteries each having at least one rechargeable electrochemical cell;
   a plurality of bi-directional current-carrying members, a first one of the plurality of bi-directional current-carrying members connecting a first terminal of one of the plurality of batteries to a like polarity terminal of a succeeding one of the plurality of batteries;
   a plurality of unidirectional current-carrying members, a first one of the plurality of unidirectional current-carrying members connecting the first terminal of the particular one of the plurality of batteries to an opposite polarity terminal of an adjacent one of the plurality of batteries;
   a first electrical terminal to direct power from the plurality of batteries to a load, the first electrical terminal connected, either directly or through an electrical path that includes only one or more of the bi-directional current carrying members to an anode of each of the plurality of batteries; and
   a second electrical terminal to direct power from the plurality of batteries to the load, the second electrical terminal being connected, either directly or through an electrical path that includes only one or more of the bi-directional current-carrying members, to a cathode of each of the plurality of batteries.

19. The arrangement of claim 18 wherein during charging the plurality of batteries are in a series arrangement.

20. The arrangement of claim 18 wherein during discharging the plurality of batteries are in a parallel electrical circuit arrangement.

21. The arrangement of claim 18 wherein the plurality of batteries is configured to achieve, when being charged, a charge level of approximately 90% of the charge capacity of the plurality of batteries in 15 minutes or less.

22. The arrangement of claim 18 wherein the bi-directional current-carrying members are resistors, and the unidirectional current-carrying members are diodes.

23. The arrangement of claim 18 further comprising electrical terminals to direct power to a load, wherein the electrical terminals are electrically coupled to the plurality of batteries in respective electrical paths from the electrical terminals to the each of the plurality of batteries that do not pass through another of the plurality of the batteries.

* * * * *